Patented July 15, 1924.

1,501,321

UNITED STATES PATENT OFFICE.

WILHELM EBERLEIN, OF AHRENSBURG, GERMANY, ASSIGNOR, BY MESNE ASSIGNMENTS, TO THE CHEMICAL FOUNDATION, INC., A CORPORATION OF DELAWARE.

DECOLORIZING MEDIUM FOR OILS, FATS, AND OTHER LIQUIDS AND PROCESS OF MAKING SAME.

No Drawing. Application filed May 14, 1919. Serial No. 297,174.

*To all whom it may concern:*

Be it known that I, Ing. WILHELM EBERLEIN, citizen of the Republic of Germany, residing at Ahrensburg, Holstein, Germany, have invented certain new and useful Improvements in Decolorizing Medium for Oils, Fats, and Other Liquids and Processes of Making Same, of which the following is a specification.

My invention relates to improvements in the process of making a decolorizing medium for oils, fats, and other liquids, and the decolorizing medium produced thereby, and the object of the improvements is to provide a decolorizing medium which is highly effective. With this object in view my invention consists in the matters described hereinafter and particularly pointed out in the appended claims.

Heretofore, for decolorizing oils, fats, and other liquids animal charcoal, activated charcoal, black, or fuller's earth have been used. To provide substitutes for these decolorizing media, it has been proposed to use carbon made from peat which has been treated with alkali, or alkaline extracts from wood, straw, and the like. Furthermore, it has been proposed to provide a decolorizing medium similar to bone charcoal by impregnating porous substances, such as baked argil, pumice, hydrate of silicic acid which has been heated to a glowing temperature, with blood, a solution of glue, molasses, tar, and the like, and to heat at a glowing temperature the impregnated pieces in the absence of air. The decolorizing media which have thus been obtained are not very efficient.

I have discovered, that a highly efficient decolorizing medium is obtained by mixing alkaline extracts from peat, brown coal, or the like with finely subdivided non-carbonizable substances, and heating the mixture in the absence of air. The ratio of the carbon supplying substance (alkaline extract from an organic substance) and non-carbonizable substance forming the carrier is ordinarily of minor importance with reference to the efficiency of the decolorizing medium, provided, that the amount of carbon producing substance is sufficient to coat with active carbon the whole surface of the carrier, and provided further, that there is an amount of carrier substance which is sufficient to take up the active carbon formed and to prevent the formation of compact non-efficient carbon. As carriers practically all the non-carbonizable substances in minute subdivision may be used, and good results have been obtained for instance when using argil, kieselguhr, lime, kitchen salt, and other substances. The efficiency of the substances is increased as the degree of division is increased. The active carbon may be produced from various alkaline solutions or extracts of organic substances, for example from the alkaline extract of brown coal, peat and the like.

Before being used the decolorizing carbon is freed from all substances which are soluble in the liquid to be treated. This may be done by any known or preferred method such as, for example, washing with water or acids.

*Example 1.*—An extract is made from brown coal by treating the same with an aqueous solution of soda i. e., sodium carbonate, at room temperature. The solution is then mixed with from 8 to 10 times the amount of argil, and the mixture is heated to a glowing temperature in the absence of air. The carbonized product is washed with water and acid, and finally dried.

2. An alkaline extract of brown coal or peat is intimately mixed by grinding with from 5 to 10 times the amount of the extract employed of kitchen salt, and heated in the absence of air. The soluble salts are removed by washing with acids or a small amount of the liquid to be treated such as fats or oils.

Since the invention pertains to the utilization of extracts from peat, as well as to the utilization of extracts from brown coal, it is to be understood that the term "brown coal" used in the subjoined claims includes peat.

I claim:

1. The herein described process for the production of a decolorizing medium, which comprises extracting brown coal with an alkali, coating sodium chloride with said extract by mixing the same therewith and heating the coated sodium chloride to a glowing temperature in a non-oxidizing atmosphere.

2. The herein described process for the production of a decolorizing medium, which comprises extracting brown coal with a solution of sodium carbonate, coating sodium chloride with said extract by mixing the same therewith and heating the coated sodium chloride to a glowing temperature in a non-oxidizing atmosphere.

3. The herein described process for the production of a decolorizing medium, which comprises extracting brown coal with a solution of sodium carbonate, coating sodium chloride with said extract by mixing the same therewith, heating the coated sodium chloride to a glowing temperature in a non-oxidizing atmosphere, and removing soluble matters by washing.

4. In the production of a decolorizing medium, the process step which consists in heating sodium chloride coated with an alkali extract of brown coal to a glowing temperature in the absence of air.

5. In the production of a decolorizing medium, the process steps which consists in coating sodium chloride with an alkali extract of brown coal, and then heating to a glowing temperature in a non-oxidizing atmosphere.

6. In the production of a decolorizing medium, the process steps which consists in coating sodium chloride with an aqueous sodium carbonate extract of brown coal, and then heating to a glowing temperature in the absence of air.

7. The herein described decolorizing medium which consists of sodium chloride upon the surfaces of which carbon is deposited, the same being produced by coating sodium chloride with an alkali extract of brown coal and heating the coated sodium chloride in a non-oxidizing atmosphere to a glowing temperature.

In testimony whereof I have hereunto set my hand in the presence of two subscribing witnesses.

Dr. Ing. WILHELM EBERLEIN.

Witnesses:
 WILHELM LEHRKE,
 EDITH REUKER.